US011157929B1

(12) United States Patent
Eby et al.

(10) Patent No.: US 11,157,929 B1
(45) Date of Patent: Oct. 26, 2021

(54) SYSTEM AND METHOD FOR IDENTIFYING MOBILE DEVICE USERS USING A WIRELESS COMMUNICATIONS DEVICE AT AN ENTITY LOCATION

(71) Applicant: Walgreen Co., Deerfield, IL (US)

(72) Inventors: Nicholas Eby, Downers Grove, IL (US); Joe Rago, Westmont, IL (US); Kartik Subramanian, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 721 days.

(21) Appl. No.: 15/189,675

(22) Filed: Jun. 22, 2016

(51) Int. Cl.
*G06Q 30/02* (2012.01)
*H04L 29/08* (2006.01)
*H04W 4/02* (2018.01)
*H04W 64/00* (2009.01)
*H04W 4/80* (2018.01)

(52) U.S. Cl.
CPC ....... *G06Q 30/0205* (2013.01); *H04L 67/306* (2013.01); *H04W 4/023* (2013.01); *H04W 4/80* (2018.02); *H04W 64/00* (2013.01)

(58) Field of Classification Search
CPC .... G06Q 10/00; G06Q 30/02; G06Q 30/0261; G06Q 30/0255; G06Q 30/0264; G06Q 30/0286; H04M 3/42348; H04W 4/02
USPC ................................. 705/7.11–7.42
See application file for complete search history.

(56) References Cited

U.S. PATENT DOCUMENTS

| | | | | |
|---|---|---|---|---|
| 2004/0054592 | A1* | 3/2004 | Hernblad | G06Q 20/32 705/15 |
| 2013/0297422 | A1* | 11/2013 | Hunter | G06Q 30/0261 705/14.58 |
| 2014/0279014 | A1* | 9/2014 | Roka | G06Q 30/0261 705/14.58 |
| 2014/0379472 | A1* | 12/2014 | Rao | H04W 4/21 705/14.53 |
| 2015/0058129 | A1* | 2/2015 | Nevid | G06Q 30/0269 705/14.64 |
| 2015/0112826 | A1* | 4/2015 | Crutchfield, Jr. | G06Q 30/0601 705/26.1 |

(Continued)

OTHER PUBLICATIONS

Namiot et al., Local Messages For Smartphones, Aug. 23, 2013, 2013 Conference on Future Internet Communications (IEEE), pp. 1-6 (Year: 2013).*

*Primary Examiner* — Robert D Rines
(74) *Attorney, Agent, or Firm* — Marshall, Gerstein & Borun LLP; Randall G. Rueth

(57) ABSTRACT

Systems and methods are provided for identifying and communicating with a user through the user's mobile device. One example method includes receiving, from the mobile device, a user identifier associated with the user and an entity identifier associated with an entity location, the entity identifier being obtained by the mobile device from a wireless transmitter located adjacent to an entrance of the entity location; retrieving user profile data associated with the user identifier from a user database, the user profile data including a user qualifier; providing the user profile data to a display device at the entity location, the display device configured to display the user profile data, including the user qualifier; and sending at least one notification to the mobile device for display thereon, the at least one notification comprising at least one of information related to the entity location and a portion of the user profile data.

20 Claims, 6 Drawing Sheets

(56) References Cited

U.S. PATENT DOCUMENTS

| | | | |
|---|---|---|---|
| 2015/0269624 A1* | 9/2015 | Cheng | G06Q 30/0267 705/14.58 |
| 2016/0092943 A1* | 3/2016 | Vigier | G06Q 30/0281 705/346 |
| 2016/0189170 A1* | 6/2016 | Nadler | G06Q 30/0601 705/26.1 |
| 2017/0026788 A1* | 1/2017 | Kostka | H04W 76/11 |
| 2017/0091819 A1* | 3/2017 | Krause | G06Q 30/0259 |
| 2017/0213178 A1* | 7/2017 | Todd | H04L 12/4625 |

* cited by examiner

SYSTEM AND METHOD FOR IDENTIFYING MOBILE DEVICE USERS USING A WIRELESS COMMUNICATIONS DEVICE AT AN ENTITY LOCATION

TECHNICAL FIELD

This disclosure relates to identifying mobile device users at an entity location, and more particularly, to identifying each user using the mobile device of the user and a wireless communication device at the entity location.

BACKGROUND

In most cases, when a person enters a retail store, the store's employees have no knowledge of the person's identity, shopping history, preferences, or interests. As a result, store employees must approach the person with a "blank slate" in mind, providing standard greetings and uniform customer service regardless of whether the person is a preferred customer (e.g., based on store loyalty program activity), an occasional customer of the store, or a first-time shopper. For example, store employees may share in-store specials or other promotions information with each person entering the store, regardless of whether the person is interested in hearing this information.

By contrast, if a store employee recognizes a person entering the store, for example, because the person is a long-time and/or frequent customer of the store, the store employee's interaction with the customer may be personalized based on past encounters and/or tailored to the employee's knowledge of the customer's preferences, interests, etc. For example, the store employee may refrain from sharing the in-store specials upon recognizing a customer that routinely comes into the store for pharmacy or photo pick-ups and never stops at any other department. Likewise, the store employee may highlight the in-store specials related to beauty products upon recognizing a customer that enjoys trying new beauty products and/or regularly shops in the beauty department of the store. However, such personalized interaction is only possible with a limited number of customers, if any, and only at that retail location, for as long as the relationship-building employees remain at the location.

Accordingly, there is still a need for a customer interaction system that can provide store employees with information about a customer entering a retail store and can provide the customer with more personalized experience while in the store.

SUMMARY OF THE INVENTION

The invention is intended to solve the above-noted problems by providing systems and methods configured to identify and communicate with mobile device users at an entity location, and/or anticipate user needs and provide appropriate assistance, using the mobile device of the users and one or more wireless communication device(s) at the entity location.

For example, one embodiment provides a computer-implemented method for identifying and communicating with a user through the user's mobile device. The method includes receiving, from the mobile device, a user identifier associated with the user and an entity identifier associated with an entity location, the entity identifier being obtained by the mobile device from a wireless transmitter located adjacent to an entrance of the entity location; retrieving user profile data associated with the user identifier from a user database, the user profile data including a user qualifier; providing the user profile data to a display device at the entity location, the display device configured to display the user profile data, including the user qualifier; and sending at least one notification to the mobile device for display thereon, the at least one notification comprising at least one of information related to the entity location and a portion of the user profile data.

Another example embodiment provides a system in network communication with a mobile device of a customer, the system comprising a retail store system and a central system in network communication with the mobile device and the retail store system. The retail store system includes an employee device configured to display customer profile data associated with the customer, the customer profile data including a customer qualifier. The retail store system also includes a wireless transmitter positioned adjacent to an entrance of a retail store, the wireless transmitter being configured to transmit a store identifier associated with the retail store within a predetermined transmission range, wherein the mobile device receives the store identifier upon entering the predetermined transmission range. The central system includes a customer database configured to store the customer profile data in association with a user identifier associated with the customer. The central system also includes a central server configured to receive, from the mobile device, the store identifier and the user identifier; retrieve the customer profile data from the customer database based on the user identifier; provide the customer profile data to the employee device; and send at least one notification to the mobile device for display thereon, the at least one notification comprising at least one of information related to the retail store and a portion of the customer profile data.

Yet another example embodiment provides a computer-implemented method of communicating a customer presence in a retail store using a mobile device. The method includes receiving, via a wireless receiver of the mobile device, a store identifier associated with a retail store, the store identifier being transmitted by a wireless transmitter located adjacent to an entrance of the retail store, and the mobile device receiving the store identifier upon entering a predetermined transmission range of the wireless transmitter; retrieving, from a memory of the mobile device, a user identifier associated with the customer; transmitting, via a wireless transceiver of the mobile device, the user identifier and the store identifier to a central server; receiving, via the wireless transceiver, at least one notification from the central server, the at least one notification comprising at least one of information related to the retail store and customer profile data associated with the user identifier; and displaying the at least one notification on a display of the mobile device.

Other implementations are contemplated in accordance with the techniques described herein, as will be apparent to one having ordinary skill in the art upon examination of the following drawings and detail description, and such implementations are intended to within the scope of this disclosure.

BRIEF DESCRIPTION OF THE DRAWINGS

For a better understanding of the invention, reference may be made to the exemplary and non-limiting embodiments shown in the following drawings and described hereinafter. The components in the drawings are not necessarily to scale and related elements may be omitted, or in some instances proportions may have been exaggerated, so as to emphasize

DETAILED DESCRIPTION

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1:
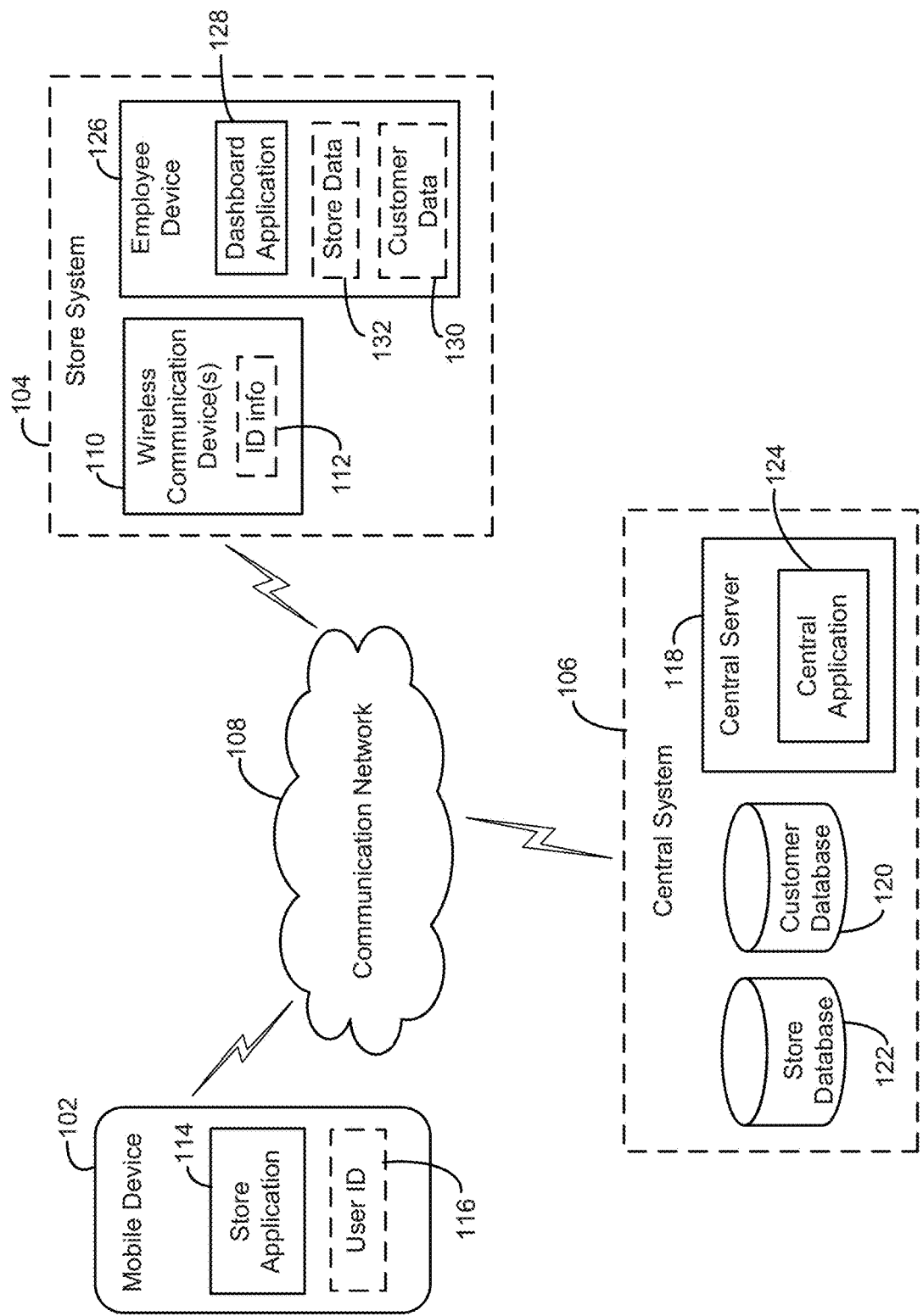
FIG. 1 is a block diagram illustrating an exemplary environment for identifying and communicating with a customer in a retail store and/or anticipating the customer's needs, in accordance with embodiments.

FIG. 1 illustrates an exemplary environment 100 for identifying and communicating with mobile device users at an entity location, such as, for example, customers in a retail store, and/or anticipating user needs and providing appropriate or targeted assistance to the users while visiting the entity location, in accordance with embodiments. Although the embodiments described herein are explained in the context of a retail store, the term "entity location" is used herein to include both retail and non-retail entities, such as, for example, restaurants, hotels, health and beauty services, or any other entity having one or more establishments are communicatively coupled to a central or enterprise system.

Figure 2:
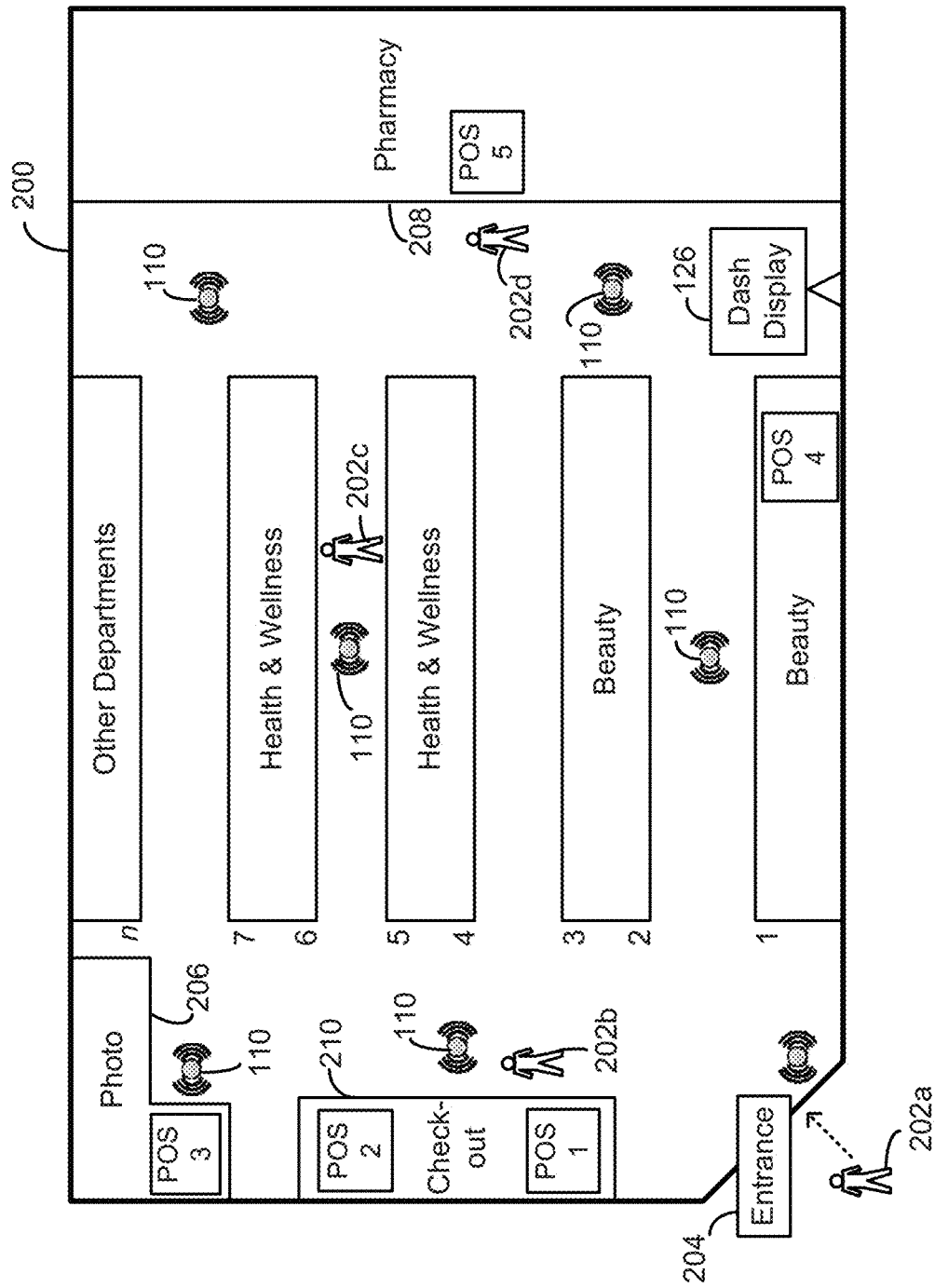
FIG. 2 is a block diagram illustrating an exemplary retail store, in accordance with embodiments.

As shown, the environment 100 includes a mobile computing device 102 (also referred to herein as "mobile device"), a retail store system 104 (also referred to herein as "store system), and an enterprise or central store system 106 (also referred to herein as a "central system") in communication with the mobile device 102 and the retail store system 104 via a communication network 108. In embodiments, the central system 106 can be configured to communicate with a plurality of retail stores (not shown) via the communication network 108, and each retail store can have a corresponding retail store system 104 housed within the retail store. FIG. 2 illustrates an exemplary retail store 200 that may be representative of any one of the plurality of retail stores communicatively coupled to the central system 106 and includes the components of the retail store system 104. The mobile device 102 shown in FIG. 1 can be associated with, or operated by, a user or customer located adjacent to or inside a given retail store, such as, for example, a customer 202 entering the retail store 200, as shown in FIG. 2.

According to embodiments, the environment 100 can be configured to provide identification of the customer 202 to an employee of the retail store 200 using the mobile device 102, as the customer 202 enters the retail store 200 or shortly after an arrival of the customer 202 at the retail store 200. In embodiments, the environment 100 can be further configured to monitor a location of the customer 202 within the store 200 and anticipate one or more customer needs based on one or more aspects of the customer's behavior and/or account history. Also in embodiments, the environment 100 can be configured to communicate with the mobile device 102 of the customer 202 to (1) address the identified need(s) of the customer, for example, by providing messages to the mobile device 102 that are relevant to the identified need and/or the customer's current location within the store 200, and/or (2) welcome the customer 202 to the store 200 by providing a welcome notification and/or a message conveying information about the store 200. Example techniques for carrying out these and other aspects of the environment 100 will be described in more detail below.

Figure 3:
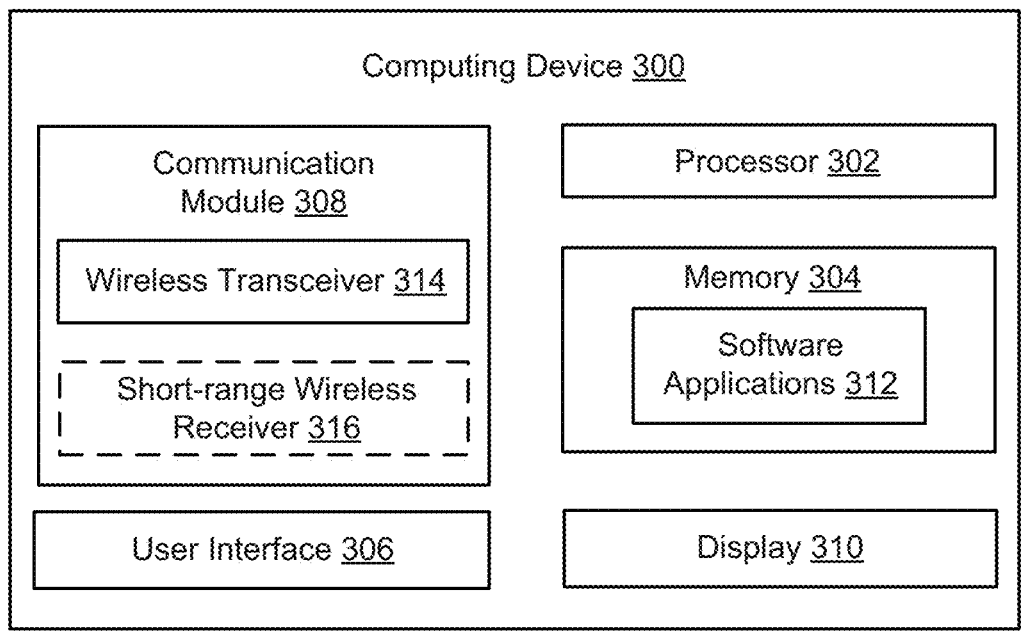
FIG. 3 is a block diagram of an example computing device for implementing various operations of the environment shown in FIG. 1, in accordance with embodiments.

Various components of the environment 100, and/or interactions therebetween, may be implemented using software executable by one or more servers or computers, such as exemplary computing device 300 with a processor 302 and a memory 304, as shown in FIG. 3 and described in more detail below. In embodiments, one or more instances of the computing device 300 may be utilized to implement the mobile device 102; any, some, or all of the components of the retail store system 104; and any, some, or all of the components the central system 106. In some embodiments, all or portions of the central system 106 and/or the store system 104 may be implemented by a proprietary computer system (not shown), such as, for example, Walgreen Company's Intercom Plus (IC+) computer system. Moreover, certain interactions between components of the environment 100 may be implemented by software stored in and executed by the mobile device 102, one or more computing devices of the central system 106, and/or one or more computing devices of the store system 104, as described herein.

Figure 4:
FIG. 4 is a screenshot of an exemplary dashboard interface displayed on an employee device of the environment of FIG. 1, in accordance with embodiments.

Certain interactions between the components of the environment 100 may include providing displayable content to one or more computing devices included in the store system 104, and/or causing the device(s) to display the same, in the form of a customer dashboard interface, for example, as illustrated by the exemplary screenshot shown in FIG. 4. Additional interactions between the components of the environment 100 may include providing displayable content to the mobile device 102, and/or causing the mobile device 102 to display the same, in the form of web pages, text messages, prompts, and/or other notifications, for example, as illustrated by the exemplary screenshot shown in FIG. 5. Further interactions between the components of the environment 100 may include providing identifying information related to the retail store 200 to the mobile device 102, and transmitting the identifying information, and a user identifier associated with the customer 202, from the mobile device 102 to the central system 106.

Referring now to FIGS. 1 and 2, the retail store 200 can be configured to include one or more wireless communication devices 110 configured to transmit or broadcast a wireless signal comprising identifying information 112 to the mobile device 102 or any other electronic devices capable of receiving the wireless signal. In embodiments, the one or more wireless communication devices 110 can be configured to transmit the wireless signal within a predefined transmission range, and the mobile device 102, or other electronic device, can be configured to receive the signal, and the identifying information 112 therein, when located within this range. In some embodiments, the communication device(s) 110 can be configured to transmit the wireless signal upon detecting the mobile device 102 within a predefined proximity of the device 110 using any suitable proximity detection techniques.

In some embodiments, a single wireless communication device 110 is positioned at, near, or adjacent to a main entrance 204 of the retail store 200, and the mobile device 102 receives the wireless signal upon nearing the entrance 204. In other embodiments, a plurality of wireless communication devices 110 are positioned at various locations throughout the retail store 200, including the entrance 204, and as the customer 202 moves through the store 200, the mobile device 102 receives wireless signals from different communication devices 110 depending on the in-store location of the customer 202, or which communication device 110 is in closest proximity to the mobile device 102. For example, as shown in FIG. 2, the wireless communication devices 110 may be positioned at the entrance 204, as well as in certain departments (e.g., "Photo", "Beauty," "Pharmacy," and "Health & Wellness"), relative to certain aisles (e.g., aisles 1 through n), and/or near point-of-sale (POS) counters (e.g., "POS 1," "POS 2," and "POS 5").

The wireless communication devices 110 can be emitters or other suitable communication devices configured to transmit or broadcast signals within the predefined transmission range in accordance with one or more communication protocols and/or standards, such as, for example, Bluetooth®, Bluetooth® Low Energy (BLE), radio frequency identification (RFID), near field communication (NFC), and/or Wi-Fi communication protocols. In one example embodiment, the wireless communication devices 110 are implemented as iBeacon devices developed by Apple Inc. In such case, the wireless communication devices 110 are configured to transmit the identifying information 112 in accordance with one or more standards utilized by iBeacon devices, such as, for example, the BLE protocol, and can have a predefined transmission range of, for example, 10, 30, or 100 meters depending on the power or class of the Bluetooth device.

As will be appreciated, each of the wireless communication devices 110 can include any suitable number of wireless transmitters, receivers, and/or transceivers, power sources, processors, memories, etc. to facilitate the functionalities described herein. In some embodiments, the communication devices 110 are configured only to transmit signals and do not receive communications. Such embodiments may be preferred in communication devices 110 that employ a battery power source in order to reduce power consumption.

In other embodiments, the communication devices 110 are configured to transmit and receive communications. In some embodiments, one or more of the communication devices 110 can include a global navigation satellite system (GNSS) receiver and/or other suitable types of receivers for obtaining a geographic location of the device 110 (e.g., location coordinates) and/or to determine a respective position of the device 110 via network triangulation.

The identifying information 112 (also referred to herein as "ID info.") can be stored in any suitable memory device utilized by the respective wireless communication device 110, such as, for example, flash-based memory, a battery-backed RAM, etc. In embodiments, the identifying information 112 can comprise any suitable form of presence information for identifying a location and/or identity of the respective wireless communication device 110. For example, in some embodiments, the identifying information 112 includes a unique device identifier that identifies the respective wireless communication device 110 and can be correlated to a location of the communication device 110 by a receiving device, such the mobile device 102. For example, each device identifier may be mapped to a specific location within the store 200, to the store 200 itself, or any another location, and the mobile device 102 may be configured to determine the specific location of the communication device 110 based on this mapping (e.g., using a look-up table). In embodiments, the unique device identifier may be, for example, a universally unique identifier (UUID) in accordance with an iBeacon format or other suitable format.

As another example, in some embodiments, the identifying information 112 includes a store identifier (ID) (also referred to herein as an "entity identifier") that is associated with or identifies the retail store 200 in which the wireless communication device 110 is located. In such cases, the store identifier may include, for example, a store number, a store name, a store location descriptor (e.g., street address, city, and/or state information), latitude and longitude coordinates for the store 200, and/or an alphanumeric string associated with the store 200. As yet another example, in some embodiments, the identifying information 112 includes a location identifier that is associated with a position or location of the wireless communication device 110 within the retail store 200. In such cases, the location identifier (ID) (also referred to herein as an "in-store location ID") may include, for example, an in-store location name or descriptor (e.g., aisle number, store department name, etc.), latitude and longitude coordinates for the in-store location, and/or an alphanumeric string associated with the in-store location.

In some embodiments, the identifying information 112 includes a combination of different identifiers. For example, for each communication device 110, the identifying information 112 may include a device identifier that is uniquely associated with that device 110 (e.g., UUID), as well as a store identifier that is associated with the retail store 200 and/or a location identifier that is associated with the particular location of the communication device 110 within the retail store 200. In such cases, a portion of the identifying information 112 can be unique to the communication device 110 and/or the in-store location of the device 110, while another portion of the identifying information 112 (e.g., the store identifier) can be common to all communication devices 110 within the retail store 200.

In some embodiments, the wireless signals transmitted by the communication devices 110 also include power information, such as a received signal strength indicator (RSSI), and/or ranging data to indicate a proximity of, or distance from, the mobile device 102 to the respective communication device 110. For example, each communication device 110 may store a power value representing a calibrated RSSI that was measured 1 meter from the communication device 110 during, for example, an initial set-up or testing scenario. Each of the communication devices 110 can be configured to transmit this calibrated power value along with the identifying information 112 to the mobile device 102 or other device receiving the wireless signal. The receiving device 102 can be configured to compare the calibrated RSSI to the actual RSSI of wireless signal received from the communication device 110 to estimate a proximity to the transmitting device 110. This proximity information may be used by the mobile device 102, for example, to determine which of the communication devices 110 are in closest proximity to the mobile device 102 and/or triangulate an in-store location of the mobile device 102. In some cases, the triangulation technique can be used to precisely pinpoint a location of the mobile device 102 within the store 200, such as, for example, the exact aisle and/or a location within the aisle.

In other embodiments, for example, where the communication devices 110 are not iBeacon devices, the mobile device 102 can be configured to detect its proximity to a respective wireless communication device 110 using other suitable proximity detection techniques. For example, proximity detection may be accomplished by any suitable ranging techniques, such as, for example, signal attenuation measurement and/or propagation time of arrival (ToA) and time of departure (ToD) timestamping techniques. As another example, in some embodiments, the mobile device 102 can be configured to detect proximity to a respective communication device 110 by listening to and/or analyzing one or more sounds emitted from the device 110. In other embodiments, the store system 104 may include Bluetooth-enabled LED lights or other physical markers within the store 200 for indicating a location of the mobile device 102. For example, the markers may be configured to turn on or light up upon detecting the mobile device 102 within a vicinity of a respective marker using a Bluetooth signal transmitted by the mobile device 102.

For the sake of simplicity, FIG. 1 only shows one mobile device 102. However, it will be appreciated that the environment 100 may include a plurality of mobile devices respectively associated with each customer adjacent to or positioned within the store 200 and similar to the mobile device 102 described herein. In embodiments, each mobile device 102 may be implemented as user equipment (UE), such as, for example, a smartphone, or any other suitable communication device configured to communicate or interact with the other components of the environment 100 via the communication network 108 using one or more wired and/or wireless links for sending data to and/or receiving data from said components. For example, the mobile device 102 may be implemented as a portable computing device, a personal digital assistant (PDA), a tablet computer, a laptop computer, a wearable electronic device, etc. As will be appreciated, the mobile device 102 may be associated with a unique phone number, as well as other numbers or indicia for identifying the mobile device 102, including, for example, a media access control (MAC) address or Internet Protocol (IP) address, a mobile directory number, subscriber or local routing number (LRN), and/or mobile identification number (MIN).

The mobile device 102 can include hardware devices (e.g., a processor, a memory, a display, a communication module, and/or a user interface) and one or more software applications stored in the memory for facilitating interactions with, and/or presenting content received from, other components of the environment 100. The one or more software applications can include a mobile store application 114 (also referred to herein as "store application") configured to facilitate interactions with, present content received from, and/or provide user selections and user-entered information to the central store system 106 and/or the retail store system 104. In some cases, the mobile device 102 can also store a user identifier 116 associated with the user of the mobile device 102 (e.g., the customer 202).

The user identifier 116 may be used by one or more components of the environment 100 to determine an identity of the user or otherwise retrieve customer information associated with the user. As an example, the user identifier 116 may include account information (e.g., username, account number, etc.) associated with an account held by the user at the retail store 200, such as a customer account, a member account, a loyalty account, a rewards account, etc. In some cases, the user identifier 116 can be stored in, or in association with, the store application 114. The user identifier 116 and any other account information stored in the mobile device 102 may be entered into the mobile device 102 by the user (e.g., via the user interface) or may be downloaded onto the mobile device 102, for example, through the store application 114.

In embodiments, the mobile store application 114 can be a mobile application that is at least partially stored in, and operates on, the mobile device 102 and is associated with, or native to, the central store system 106. As an example, the store application 114 may be configured to, among other things, store and/or retrieve the user identifier (ID) 116 and other account information associated with the user of the mobile device 102; enable the user to access deals, coupons, and other promotions offered by the retail store 200; enable the user to purchase one or more items from the retail store 200 and/or place an order for pick-up; present, on the display of the mobile device 102, notifications received from the central system 106 or other components of the environment 100; process identifying information 112 received from the wireless communication device(s) 110 to identify the retail store 200 in which the device 110 is located and/or the in-store location of the communication device 110; and/or provide the user identifier 116 and the store information retrieved from the identifying information 112 to the central system 102.

In some embodiments, upon receiving the wireless signal and/or the identifying information 112 from a respective communication device 110, the mobile device 102 can be configured to automatically launch or initiate the store application 114 or other software application for processing the identifying information 112. In other embodiments, the mobile device 102 may be configured to detect or receive wireless signals from the communication device(s) 110 only if the store application 114 has already been launched or opened on the mobile device 102. In some cases, the store application 114 or the other software application can be configured to run in the background, so as to not require user input to control processing of the identifying information 112 and/or transmittal of the processed information and user ID to the central system 102.

In some embodiments, the one or more software applications may further include a web browser that is stored in and operating on the mobile device 102 and can be used to access a website hosted by the central system 106 and/or load one or more web pages associated therewith and/or the store application 114. In some cases, a webpage provided by the central system 106 may be displayed in a graphical user interface of the store application 114 as an application page, instead of using the web browser. For example, one of the notifications received from the central system 106 may include a user-selectable link to a web page that is hosted by the central system 106, and user selection of the link may open the web page as an application page within the store application 114.

In some embodiments, the one or more software applications further includes a software development kit (SDK) configured to capture wireless signals from respective wireless communication device(s) 110, decode the received signal and/or the identifying information 112 included therein, and decipher the physical location of the mobile device 102 based on the identifying information 112. In other embodiments, this SDK is included in the store application 114.

In some embodiments, the mobile device 102 can be configured to store a data table (e.g., look-up table) or the like that maps various pieces of identifying information to corresponding retail stores and/or in-store locations. For example, the data table can include an entry for each communication device 110 included in each retail store 200 that is communicatively coupled to the central system 106, and each entry can include the identifying information 112 that is being transmitted by the respective communication device 110, as well as store information, such as a store ID, identifying the retail store 200 in which the communication device 110 is located and/or in-store location information, such as an in-store location ID, identifying the exact location of the device 110 within the store.

The data table may be downloaded and stored in a memory of the mobile device 102 upon installation of the store application 114, may be included in the store application 114, and/or may be part of the SDK described herein. Upon receiving the identifying information 112 from a respective communication device 110, the mobile device 102, and/or the store application 114 executed by the processor included therein, can access the data table and use the received information 112 to determine an identity of the retail store 200 in which the communication device 110 is situated, and/or the location of the communication device 110 within the store 200.

In other embodiments, the mobile device 102 may be configured to send the received identifying information 112 to the central system 106, and the central server 118 may be configured to identify the corresponding retail store or in-store location of the communication device 110 based on the received information 112. In such cases, the data table may be stored in a memory or database of the central system 106. In still other embodiments, a data table may not be required to identify the location of the communication device 110. For example, in embodiments where the identifying information 112 includes the store ID and/or the in-store location ID associated with the respective communication device 110, the mobile device 102 can be configured to retrieve the store ID and/or location ID directly from the identifying information 112 and provide the retrieved identifiers to the central system 106.

The central system 106 may include any suitable number of components that are owned and/or operated by the enterprise that oversees the retail stores communicatively connected to the central system 106, and are configured to implement the operations of the environment 100, as described herein. For example, as shown in FIG. 1, the central system 106 can include one or more servers, such as central server 118, one or more databases, such as customer database 120 and retail store database 122, and/or other computing devices. The components of the central system 106 may communicate with each other using any suitable number of wired and/or wireless links, including via the communication network 108. As will be appreciated by those of ordinary skill in the relevant art(s), the central system 106 may store, access, and/or transmit secure data that is of a private, proprietary, and/or sensitive nature. As a result, various embodiments of the central system 106, as well as the communication network 108, the mobile device 102, the retail store system 104, and/or other components of the environment 100, may implement appropriate security protocols such as encryption, secure links, network authentication, firewalls, etc., to appropriately protect such secure data.

Central server 118 may be implemented as, for example, any suitable number of web servers configured to provide Internet communications to one or more mobile computing devices of the environment 100, such as the mobile device 102, to process application programming interface (API) service calls, and/or to support one or more applications installed on a computing device (such as, e.g., computing device 300) of the central system 106. In addition, or alternatively, central server 116 may be implemented as, for example, any suitable number of database servers configured to access data from databases 118 and/or 120.

As will be appreciated, the central server 118 can include hardware devices (e.g., a processor, a memory, a display, a communication module, and/or a user interface) and one or more software applications stored in the memory for facilitating interactions with other components of the environment 100. The one or more software applications can include a central store application 124 configured to facilitate interactions with the mobile device 102 and/or the retail store system 104. For example, the central store application 124 may be configured to, among other things, receive a store identifier, an in-store location, and/or a user identifier from the mobile device 102; provide displayable content to the mobile device 102, such as store data associated with, and/or notifications related to, the retail store 200 that was identified based on the received information; and/or provide displayable content to the retail store system 104, such as customer information associated with the customer 202 identified as entering or browsing the store 200.

Customer database 120 may be configured to store any relevant customer data related to operation of the environment 100. Such data may include, for example, customer profile data that includes customer information (e.g., name; mailing address, email address, mobile phone number, home phone number, and/or other contact information; date of birth; age; gender; Social Security Number); user identifier 116 (e.g., a loyalty account number, a member identification (ID) number, patient ID number, a username, or other customer identifying information); a picture of the customer; account history information (e.g., online shopping history, in-store shopping history, shopping preferences, average purchase price in-store, average purchase price online, other spending habits, date last visited the retail store 200 or another enterprise location, or any other information related to previous account activity); a customer qualifier or label for categorizing the customer based on the account history of the customer and/or other profile data, the qualifier being selected from a list of pre-defined qualifiers, or customer segments, (e.g., "Medicare Part-D," "Photo Aficionado," "High-Value," "High-Value Rx," "Low-Value Repeat," etc.); payment information (e.g., credit card information, debit card information, etc.); and any other profile information for each customer of the retail store 200.

One or more components of the central system 106, such as server 118, may communicate with customer database 120 to store data to and/or read data from database 120, as needed to facilitate appropriate functions of the embodiments described herein. In embodiments, the central server 118 can be configured to retrieve corresponding customer profile data (also referred to herein as "user profile data") based on a user identifier 116 received from the mobile device 102. The central system 106 may communicate data retrieved from the customer database 120 to the retail store system 104 for presentation on one or more computing devices included therein, as described in more detail below.

Retail store database 122 (also referred to herein as "store database") may be configured to store any relevant retail store data related to the operations of the environment 100. Such data may include, for example, store information (e.g., store name (e.g., Walgreens-Niles), store location name (e.g., southeast corner of Main St. and First Ave.), location coordinates, street address, phone number(s), store manager name(s), website address, etc.); a store number or identifier for uniquely identifying that store; a floor map of the store; store configuration information (e.g., number and placement of aisles, products included in each aisle, number and placement of departments within the store, etc.); a list of the in-store location identifiers associated with each communication device 110 included in the store; deals, offers, coupons, or other promotional information related to the store; information about the products sold in that store; and any other information about each retail store connected to the central system 106. In some embodiments, the retail store data included in the store database 122 further includes the data table (not shown) that maps the identifying information for each communication device 110 to information about the store in which the device 110 is located and/or the in-store location of the device 100 (e.g., aisle number, department name, etc.).

One or more components of the central system 106, such as server 118, may communicate with store database 122 (also referred to herein as "entity database") to store data to and/or read data from database 122, as needed to facilitate appropriate functions of the embodiments described herein. In embodiments, the central server 118 can be configured to retrieve corresponding retail store data (also referred to herein as "entity data") from the store database 122 based on the store ID and/or in-store location ID received from the mobile device 102. The central system 106 may communicate data retrieved from the store database 122 to the retail store system 104 for presentation on one or more computing devices included therein, as described in more detail below. In some cases, the central system 106 may communicate data retrieved from the store database 122 to the mobile device 102 for presentation thereon through the store application 114, as described in more detail below.

As shown in FIG. 1, the store system 104 can further include one or more employee devices 126 configured to execute a dashboard application 128 for presenting a customer dashboard or other graphical user interface for use by store employees to identify and monitor customers within the retail store 200. In some cases, the store system 104 includes a single employee device 126 that is operated by a select employee, such as, for example, a store manager. In other cases, the store system 104 includes a plurality of employee devices 126 that are distributed to and used by a plurality of store employees, for example, as they move throughout the retail store 200. In embodiments, the employee device 126 may be implemented as user equipment (UE), such as, for example, a smartphone, or any other suitable communication device configured to communicate or interact with the other components of the store system 104, and/or the environment 100 via the communication network 108, using one or more wired and/or wireless links for sending data to and/or receiving data from said components. For example, the employee device 126 may be implemented as a portable computing device, a tablet computer, a personal digital assistant (PDA), a laptop computer, a desktop computer, a wearable electronic device, etc.

In embodiments, the dashboard application 128 can be configured to present customer profile data 130 (also referred to herein as "customer data") and/or retail store data 132 (also referred to herein as "store data") received from the central system 106 on a display screen of the employee device 126. The central system 106 may retrieve the customer data 130 from the customer database 120 based on the user ID 116 received from the mobile device 102. Likewise, the central system 106 may retrieve the store data 132 from the store database 122 based on the store ID and/or in-store location ID received from the mobile device 102. The employee device 126 may store the received retail store data 132 and/or the customer data 130 in a memory of the employee device 126 for retrieval during execution of the dashboard application 128. The dashboard application 128 may also be stored in the memory of the employee device 126.

FIG. 4 illustrates an example graphical user interface, or customer dashboard 400, that may be displayed on a display screen and/or touchscreen of the employee device 126 upon execution of the dashboard application 128 by a processor of the employee device 126, in accordance with embodiments. The customer dashboard 400 may be operated or controlled by a user, such as a store employee or store manager, via a user interface and/or touchscreen of the employee device 126.

As shown, the customer dashboard 400 includes an entry 401 for each customer 202 within the retail store 200, and each entry 401 presents information about the corresponding customer 202, including customer data 130 received from the central system 106 and/or stored in the employee device 126, and current in-store location data received from the mobile device 102 via the central system 106. In embodiments, one or more pieces of the information presented on the customer dashboard 400 can be used to personalize the customer's experience while in the store 200, for example, by providing a personalized welcome to the customer 202, sharing store information that is relevant to the needs or interests of the customer 202, and/or anticipating the needs of a given customer 202 and based thereon, provide appropriate assistance and/or attention to the customer 202, as described in more detail below.

In the illustrated embodiments, each entry 401 includes a photo 402 of the respective customer 202, a name 404 of the customer 202, a current location 406 of the customer 202 within the retail store 200 (also referred to herein as "customer location"), and a customer qualifier 408 (also referred to herein as "user qualifier") assigned to the customer 202 based on a past account history of the customer 202. The photo 402, the name 404, and the customer qualifier 408 can be obtained from the customer data 130 corresponding to each customer 202. The current location 406 can be obtained from the central system 106 (e.g., based on the identifying information 112 received by the mobile device 102 from the wireless communication device 110 that is currently positioned closest to the mobile device 102), and can be updated in real time (or near real time), or as often as the central system 106 provides the location information. In other embodiments, other and/or additional pieces of customer data 130 may be displayed on the customer dashboard 400, such as, for example, a gender and/or age of the customer 202, spending history of the customer 202, date of last visit to the store 200, one or more shopping preferences associated with the customer 202, etc.

As an example, the customer's photo 402, and/or other pieces of customer data 130 related to the appearance of a given customer 202 (e.g., gender and/or age), can be used by a store employee (also referred to herein as "assistance provider") to identify the customer 202 within the store 200, particularly if the employee plans to greet the customer 202 or approach the customer 202 to provide assistance. The customer's name 404, and/or other pieces of customer data 130 related to the identity of the customer 202, can be used by the store employee and/or dashboard application 128 to, for example, provide a personalized greeting to the customer 202, either in person or via a notification on the mobile device 102. As another example, the customer qualifier 408, and/or other pieces of customer data 130 related to the customer's account history (e.g., spending history, date of last visit, etc.) and shopping preferences, can be used by the store employee and/or dashboard application 128 to make sure that an appropriate level of customer service is offered to the customer 202 and/or to inform decisions regarding the store information (e.g., store promotions, specials, current offers, etc.) that is shared with the customer 202. The customer's current location 406 within the store 200 can be used by the store employee and/or dashboard application 128 to, for example, locate the customer 202 within the store 200 and/or provide targeted assistance to the customer 202 (e.g., store promotions that are relevant to the current location 406 or a store employee that specializes in the products found at the current location 406).

As shown, each entry 401 of the customer dashboard 400 can also include a dwell time status 410 for indicating an amount of time each customer 202 has been standing or dwelling in the current location 406. The dwell time status 410 can be used by the store employee and/or the dashboard application 128 as an indication of whether the customer 202 requires assistance. For example, if the customer 202 appears to be dwelling in the same location 406 for a long period of time (e.g., longer than a threshold amount of time), the dashboard application 128 and/or the user of the employee device 126 may determine that the customer 202 needs assistance with selecting a product.

In some embodiments, the dwell time status 410 displays an actual amount of time spent at the current location 406 (e.g., 1 minute, 30 seconds or 2.2 minutes) and updates the customer's dwell time in real time. In other embodiments, the dwell time status 410 includes a relative amount of time spent at the current location 406 as compared to a predetermined threshold. In such cases, for example, as shown in FIG. 4, the dwell time status 410 may be selected from a predefined list of status indicators for indicating that the dwell time is under the threshold, exceeds the threshold, at the threshold, or not available (N/A). A customer's dwell time may not be available, for example, when the customer 202 first walks into the store 200 or while the customer 202 is walking through the store 200. In some embodiments, the threshold time can be selected and/or adjusted by the store employee or manager. In other embodiments, the threshold can be pre-configured by a programmer of the dashboard application 128 or set to default threshold until changed. In one example embodiment, the threshold amount of time is set to two minutes. In some embodiments, the threshold amount of time can vary depending on the corresponding department, aisle, or other section of the store 200.

In some cases, the dwell time status 410 may be displayed with, or accompanied by, visual effects (e.g., flashing font, bold font, different colored font, etc.), sounds, or other types of alerts to signal that the threshold has been reached or exceeded. For example, as shown in FIG. 4, a status indicator of "Dwell time exceeds threshold" may be displayed in bold print to grab the attention of the user. In some cases, the alert may be initiated as soon as the dwell time reaches the threshold, so that an appropriate action can be initiated right away.

Timing information used to populate the dwell time status 410 may be obtained from a timer (not shown) that is included in the employee device 126 and/or implemented using the dashboard application 128. In embodiments, the employee device 126 and/or the dashboard application 128 can be configured to start the timer (also referred to herein as a "dwell timer") upon detecting a presence of the customer 202 in a department, aisle, or other section of the store 200 and to keep the timer running for as long as the customer 202 remains in that section of the store 200. For example, the timer may be started upon receiving a new customer location 406 for the respective customer 202 at the employee device 126 from the central server 106. In some cases, the timer may continue to run until the dashboard application 128 and/or the employee device 126 receives a different customer location 406, detects movement of the customer 202 away from that section of the store, and/or detects a presence of the customer 202 in a different part of the store. In other cases, the timer may stop running once the threshold has been exceeded by a predetermined amount of time (e.g., 15 seconds, 30 seconds, etc.), even if the customer 202 is still dwelling in the same location.

The information presented on the customer dashboard 400 can be used in a number of ways to improve and/or refine the customer service provided to each customer 202. For example, the information may be used to anticipate the needs of the customer 202 while shopping at the store 200 and/or to offer appropriate customer assistance based on the identified need, including helping the customer 202 with locating and selecting a product, picking up an order, checking out, or answering questions about a product or order. In some cases, the customer service provided to the customer 202 is in the form of self-service assistance, for example, by directing the customer to existing online tools or sending helpful messages to the customer via the mobile device 102. In other cases, the customer service involves live or in-person assistance, for example, from a store employee.

According to embodiments, the type of customer assistance, or customer service action, provided to each customer 202 can be category-specific actions, depending on the values associated with various customer data, such as, for example, the customer qualifier 408 associated with the customer 202, the customer location 406 or the store department in which the customer 202 is currently located, and/or the dwell time status 410 for that location 406. In some cases, the appropriate customer service action can be determined based on the values associated with a combination of the categories, such as, for example, the customer location 406 together with the dwell time status 410. In other cases, the appropriate customer service action can be determined based on the value associated with a single category, such as, for example, the customer qualifier 408.

In some embodiments, the dashboard application 126 and/or the central application 124 may automatically initiate a corresponding customer service action upon receiving the required pieces of information and/or once a predetermined set of circumstances (or values) are met. For example, in some cases, the central application 124 is configured to automatically send a welcome notification to the mobile device 102 upon detecting a presence of a customer 202a at the entrance 204 to the store 200, as described in more detail below. In other cases, the dashboard application 126 may be configured to initiate the welcome notification upon receiving an "Entrance" value as the current location 406 of the customer 202a from the central system 106 or otherwise detecting a presence of the customer 202a at the entrance 204. In such cases, the dashboard application 12 may initiate the welcome notification by either sending the notification to the mobile device 102 directly or instructing the central application 124 to send the notification to the mobile device 102.

In other embodiments, the customer service action is manually initiated by entry of a user input via the customer dashboard 400. For example, in FIG. 4, each entry 401 includes user-selectable options 412 for selecting whether or not to initiate a given customer service action for the corresponding customer 202. While FIG. 4 only shows two options 412 (e.g., "Yes" and "No") for initiating an action, it will be appreciated that any suitable number of options 412 may be displayed on the customer dashboard 400 for use in reacting to each customer 202. In some cases, the options 412 may be presented as a list of available actions, such as, for example, "Send employee to greet customer at the entrance," "Send welcome notification to the customer's phone," and "Send in-store promotions information to customer's phone." In such cases, the store manager or other user of the employee device 126 can decide which of the actions is/are most appropriate based on the information displayed in that customer's entry 401.

According to embodiments, the available customer service actions can include sending a store employee to greet a respective customer 202 and/or provide assistance to the customer 202, depending on the information displayed in that customer's entry 401. In some cases, the user of the employee device 126 directs another store employee to greet and/or assist the customer 202, for example, by sending an instruction through the employee's own employee device 126, or through a headset or other audio communication device worn by the employee. In other cases, the user of the employee device 126 may perform the customer service action himself.

For example, if the customer qualifier 408, the current location 406, and/or other information displayed on the customer dashboard 400 indicate that a "high value" customer has just entered the store 200, the user of the employee device 128 may direct a store employee towards the entrance 204 of the store 200 to greet the customer 202 once inside the store 200. As another example, if the customer qualifier 408, the customer location 406, and/or other information displayed on the customer dashboard 400 indicates that the customer 202a detected at the entrance 204 frequently visits the store 200 to pick up photos (e.g., "photo afficiondo"), the user of the employee device 126 may direct a store employee to a photo counter 206 of the store 200, so that the customer 202 can be assisted with no or little wait time. A similar action may be taken with respective to a pharmacy counter 208 of the store 200 if the displayed information indicates that the customer 202a detected at the entrance 204 frequently visits the store 200 to pick a prescription from the pharmacy counter 208.

To provide additional examples, if the customer qualifier 408 and the customer location 406 indicate that a "high value" customer 202b is waiting at a checkout counter 210 of the store 200, the user of the employee device 126 may direct a store employee to the checkout counter 210 to open an additional register or other point-of-sale (POS) unit. A similar action may be taken if the customer location 406 and the dwell time status 410 displayed on the customer dashboard 400 indicate that one or more customers 202 have been standing by the checkout counter 210, the pharmacy counter 208, or any other point-of-sale (POS) location within the store 200 for longer than a threshold amount of time. As another example, if the customer location 406 and the dwell time status 410 displayed on the customer dashboard 400 indicates that a given customer 202c has been standing in a certain department of the store 200 (e.g., Beauty or Health & Wellness) for longer than a threshold amount of time, the user of the employee device 126 may send a store employee to the customer location 406 to assist the customer 202 with product selection and/or location, or help answer any other questions that the customer 202 may have. As another example, a store employee may be sent to the photo counter 206 if one or more customers 202 are detected near the photo counter 206. In yet another example, a store employee may be sent to open an additional register or other POS device is more than a predetermined number of customers 202 (e.g., five) are detected at the checkout counter 210.

Also according to embodiments, the available customer service actions can include, in addition to or instead of sending a store employee to greet and/or assist the customer, sending an appropriate notification, prompt, alert, or other message to the mobile device 102 of a respective customer 202, in response to the customer data associated with the customer 202 and/or displayed in the customer's entry 401 on the dashboard 400. The messages may be displayed on the mobile device 102 using a notification feature of the store application 114 or other application stored in a memory of the mobile device 102. In some embodiments, the message may be generated by the employee device 126 and transmitted to the mobile device 102 by the same. In other embodiments, the employee device 126 may request the central system 106 to generate the message and transmit the message to the mobile device 102. In still other embodiments, the central system 106 can be configured to automatically generate the message and transmit the same to the mobile device 102, independent of the employee device 126.

Figure 5:
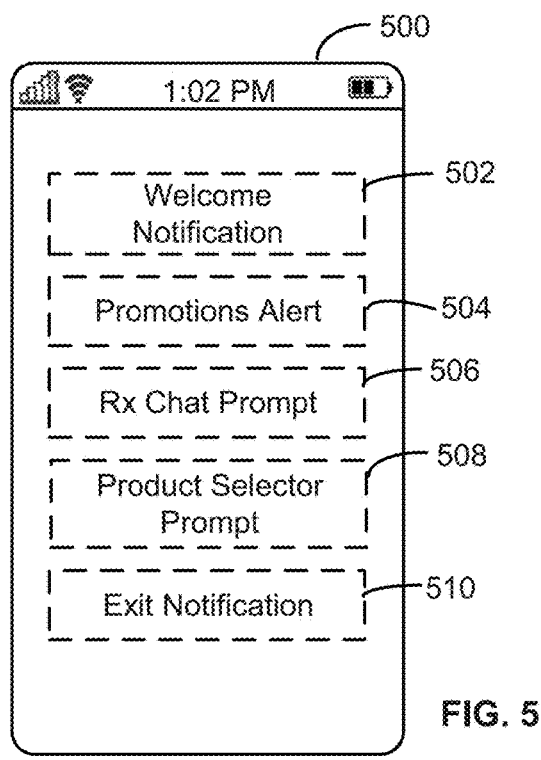
FIG. 5 is a screenshot of various exemplary notifications displayed on a mobile device of the environment of FIG. 1, in accordance with embodiments.

FIG. 5 illustrates an exemplary display screen 500 of the mobile device 102 having various exemplary messages 502-510 displayed thereon for communicating with the customer 202 in response to the customer's actions within the store 200. In embodiments, each of the messages 502-510 may be triggered by a certain customer data associated with the customer 202 and/or displayed on the customer dashboard 400. While FIG. 5 shows all of the messages 502-510 on one screen 500, it should be appreciated that the messages 502-510 may be displayed on the display screen 500 one at a time and/or at different times during the customer's visit to the store 200. The messages 502-510 may be displayed on a lock screen of the mobile device 102 or within a graphical user interface of the store application 114. In some embodiments, the messages 502-510 are received through the store application 114 and therefore, the store application 114 must be running in the background in order for the messages 502-510 to be displayed on the display screen 500. In other embodiments, receipt of one or more of the messages 502-510 can trigger a launch of the store application 114.

In embodiments, a welcome notification or message 502 can be sent to the mobile device 102 of a respective customer 202 in response to the customer's entry 401 displaying an "Entrance" value for the customer location 406 and/or in response to the presence of the customer 202a being detected at or near the entrance 204 of the store 200. As described herein, the presence of the customer 202a can be detected by the environment 100 using the wireless communication device 110 positioned adjacent to the entrance 204, as shown in FIG. 2. Once the customer 202a is detected at the entrance 204, the customer dashboard 400 can be updated to include a new entry 401 for the newly-arrived customer 202a, and the corresponding welcome notification 502 may be transmitted to, and displayed on, the customer's mobile device 102.

The welcome notification 502 can include any appropriate text or message for welcoming the customer 202a to the retail store 200. In some cases, the message may identify the store 200 by name (e.g., "Welcome to the Walgreens @ Lake!") or other identifying information (e.g., store number). In other cases, the message may additionally, or alternatively, identify the customer 202a by name (e.g., "Welcome back, Clark!") or other identifying information (e.g., a username associated with the customer's store account).

Also in embodiments, a promotions alert or message 504 comprising promotions information associated with the retail store 200 can be sent to the mobile device 102 of the customer 202. The promotions alert 504 can include any suitable text, image, or other message for conveying relevant promotions information to the customer 202. In some cases, the promotions alert 504 can be sent in response to detecting the customer 202 within the vicinity of an aisle, department, or other section of the store 200 that has an applicable promotion, special, or other offer. In other cases, the promotions alert 504 can be sent to the mobile device 102 after the customer 202 enters the store 202, for example, to inform the customer 202 of any in-store promotions or on-going specials. In such cases, the promotions alert 504 can be tailored according to the customer profile data 130 associated with the customer 202 in order to provide relevant promotions information based on, for example, the customer's shopping history and/or shopping preferences.

In embodiments, an Rx chat prompt or message 506 can be sent to the mobile device 102 of the customer 202 in response to detecting a customer 202d within the vicinity of the pharmacy counter 208 and/or after the customer 202d has been waiting or dwelling near the pharmacy counter 208 for a threshold period of time. The Rx chat prompt 506 can include an active hyperlink (such as, e.g., a short uniform resource location (URL)) or other user-clickable option that, when selected, can open an Rx chat interface either within the store application 114 or as an external webpage. The Rx chat interface can be a live messaging application configured to enable the customer 202d to message or communicate, in real-time, with a customer service representative, a pharmacist, or a store employee associated with the pharmacy department of the store 200. For example, through the Rx chat interface, the customer 202d may be able to obtain answers to questions about a certain pharmacy product, learn the status of a pending pharmacy order, and/or obtain other pharmacy-related information. In the present scenario, the customer 202d is offered use of the Rx chat interface via the mobile device 102 while the customer 202d waits in line and/or is near the pharmacy counter 208. In other cases, a customer 202 may independently access the Rx chat interface regardless of whether she is in the store 200, for example, via the store application 114 or via a separate web site associated with the store 200 using a web browser of the mobile device 102. In embodiments, the Rx chat interface may be hosted by, and/or stored in a memory of, the central system 106. For example, the Rx chat interface may be included in the central application 124 of the central system 106.

Also in embodiments, a product selector prompt or message 508 can be sent to the mobile device 102 of a respective customer 202 in response to detecting the customer 202 within the vicinity of a certain department, aisle, or other section of the store 200 and/or after the customer 202 has been standing or dwelling in that section for a threshold period of time. The product selector prompt 508 can include an active hyperlink (such as, e.g., a short uniform resource location (URL)) or other user-clickable option that, when selected, can open a product selector tool, either within the store application 114 or using an external webpage.

The product selector tool can be a graphical user interface configured to provide information about products that are relevant to the customer's current location 406 within the store 200, such as, for example, product reviews and/or recommendations, product descriptions, product comparisons, etc. In some cases, the product selector tool may offer product information that is can be found online, for example, on a webpage associated with the retail store 200. In some embodiments, the content provided by the product selector tool can vary depending on the store department. For example, the product selector tool for the beauty department may be more content-heavy and more engaging or interactive, in order to increase the customer's awareness of certain brands, new products, etc. As another example, the product selector tool for the health & wellness department may be more objective or fact-based and geared towards helping the customer 202 make an informed decision about the health products (e.g., vitamins, supplements, off-the-shelf medicines, etc.) sold by the store 200.

In the present scenario, the customer 202 is offered use of the product selector tool via the mobile device 102 while the customer 202 is in the store 200. In other cases, the customer 202 may independently access the product selector tool regardless of whether she is in the store 200, for example, via the store application 114 or via a separate web site associated with the store 200 using a web browser of the mobile device 102. In embodiments, the product selector tool may be hosted by, and/or stored in a memory of, the central system 106. For example, the product selector tool may be included in the central application 124 of the central system 106.

In some embodiments, an exit notification or message 510 can be sent to the mobile device 102 of a respective customer 202 in response to the customer's entry 401 displaying an "Exit" value for the customer location 406 and/or in response to the presence of the customer 202 being detected at or near an exit of the store 200. The exit notification 510 can include a message thanking the customer 202 for visiting the retail store 200, wishing the customer 202 a good rest of the day, or otherwise acknowledging the customer's departure (e.g., "Hope to see you again soon!").

In some cases, the exit of the store 200 may be different from the entrance 204. In such cases, a separate wireless communication device 110 may be positioned adjacent to the store exit, and the environment 100 can detect a presence of the mobile device 102 at or near the exit upon receiving identifying information 112 corresponding to that device 110. In other cases, the exit may be the same as the entrance 204. In such cases, the dashboard application 128 and/or the central application 124 may determine that customer 202 is exiting the store 202 based on the customer's prior activity in the store 200. For example, if the prior activity shows that the customer 202 is detected near the entrance 204 after leaving the checkout counter 210, the dashboard application 128 and/or the central application 124 may determine that the customer 202 is exiting the store 200. As another example, the dashboard application 128 and/or the central application 124 may determine that the customer 202 is exiting the store 200 by keeping a count of how many times the store ID associated with the store 200 has been received from the mobile device 102 within a predetermined time period. For example, the store ID may be received a first time when the customer 202 enters the store 200 and may be received a second time when the customer 202 exits the store 200.

In some embodiments, the employee device 126 can be configured to display a map or other representation of the store 200 that shows a live or real-time location and/or activity of each customer 202 within the store 200. In such cases, the store map or other representation may be obtained from the store data 132 received by the employee device 126 from the central system 106. For example, the store map may be a graphical simulation of the store's layout similar to that shown in FIG. 2. In other embodiments, the employee device 126 can be configured to display a live video of the store 200. In some cases, the customers 202 shown on the store map or other representation can be differentiated from each other by placing a different icon, number, or other tag next to or on top of each customer 202. The assigned tag (not shown) may be displayed next to that the customer's entry 401 in the customer dashboard 400 to help the employee easily identify the customer 202 on the store map or other representation. In some embodiments, a store map may be accessible by the customer 202 on the mobile device 102 through the store application 114.

Referring back to FIG. 1, the communication network 108 may include any suitable number of wired and/or wireless networks, including, for example, a local area network (LAN), a metropolitan area network (MAN), a wide area network (WAN), a personal area network (PAN) (e.g., a Bluetooth-based network), or a combination of local and/or external data networks. As a further example, the communication network 108 may include wired telephone and/or cable networks, satellite networks, cellular communication networks, and the like. In embodiments, the communication network 108 can be configured to provide the mobile device 102, the retail store 104, the central system 106, and any other component of the environment 100 with connectivity to network services, such as Internet services.

Referring now to FIG. 3, shown is a block diagram of computing device 300 housing executable software used to facilitate interactions between components of the environment 100, in accordance with embodiments. In particular, one or more instances of the computing device 300 may be utilized to implement the mobile device 102; any, some, or all of the components in the central system 106, such as, for example, central server 118, customer database 120, and/or store database 122; and/or any, some, or all of the components in the retail store system 104, such as, for example, employee device 128 and/or wireless communication devices 110. Because data stored and/or accessed by computing device 300 can include private information of the customer, embodiments of the computing device 300 can be implemented utilizing secure data storage and access procedures.

Generally, in terms of the hardware architecture as shown in FIG. 3, computing device 300 includes processor 302, memory 304, user interface 306, communication module 308, and a display 310. As will be appreciated, the user interface 306 may include one or more input devices (e.g., a keyboard, a mouse, a touch screen, etc.) and one or more output devices (e.g., an additional display, an audio speaker, etc.). Display 310 can be any suitable type of display screen, including, in some cases, a touchscreen display.

Processor 302 is a hardware device and may include one or more data processing units, such as a central processing unit (CPU) and/or a graphics processing unit (GPU). Processor 302 may also represent multiple parallel or distributed processors working in unison. When computing device 300 is in operation, processor 302 is configured to execute software stored within memory 304, to communicate data to and from memory 304, and to generally control operations of computing device 300 pursuant to the software.

Memory 304 may be a computer-readable, non-transitory, data storage device that may include one or a combination of volatile memory elements (e.g., random access memory (RAM)) or nonvolatile memory elements (e.g., ROM, hard drive, flash drive, CDROM, etc.). In some cases, memory 304 may incorporate electronic, magnetic, optical, and/or other types of storage media. Memory 304 may have a distributed architecture where various components are situated remote from one another, but are still accessed by processor 302. These other components may reside on devices located elsewhere on a network or in a cloud arrangement.

In some cases, memory 304 may be utilized to implement one or more databases, such as the customer database 120 and/or the store database 122. In some embodiments, memory 304 may also store data related to operation of the environment 100. For example, the memory 304 of the mobile device 102 may store the user identifier 116 and/or other customer account information used to identify the customer 202 to the central system 106. In the case of the employee device 126, the memory 304 may store retail store data 132 and/or customer profile data 130 received from the central system 106 for presentation on the employee dashboard.

Memory 304 is configured to store executable software, such as one or more software applications 312, some of which may or may not be unique to the environment 100. The software in memory 304 may include one or more separate programs or computer programming modules, each comprising an ordered listing of machine readable instructions that, when executed by processor 302, cause the processor 302 to perform various acts and/or implement logical functions. For example, the software in memory 304 may include a suitable operating system (O/S). The one or more software applications 312 stored in the memory 304 may vary depending on the specific application of the computing device 200. For example, in the case of the mobile device 102, the one or more software applications 312 can include the mobile store application 114. In the case of the central server 118, the one or more software applications 312 can include the central application 124. And in the case of the employee device 126, the one or more software applications 312 can include the dashboard application 128.

For purposes of communicating with other components of the environment 100 over the communication network 108 using any suitable number of wired and/or wireless links, computing device 300 is equipped with communication module 308. The communication module 308 may be configured to send and receive data over the communication network 108 using one or more network protocols, such as, for example, cellular network protocol, Internet protocol suite (TCP/IP), IEEE 802.11 Wi-Fi, BLE and/or Bluetooth, RFID, NFC, etc. Accordingly, the communication module 308 comprises various network communication equipment and circuitry, such as, for example, a telephonic interface, a cellular communication port, a network interface, a network card, such as an Ethernet card or a wireless connection card, a router, any suitable number of wired and/or wireless transceivers, etc. As shown in FIG. 3, in the case of at least the mobile device 102, the communication module 308 includes at least one wireless transceiver 314 for facilitating communications with the central system 106 (e.g., using a WiFi network) and at least one short-range wireless receiver 316 (e.g., Bluetooth receiver) for receiving the identifying information 112 from the wireless communication device(s) 110 in the retail store 200.

Figure 6:
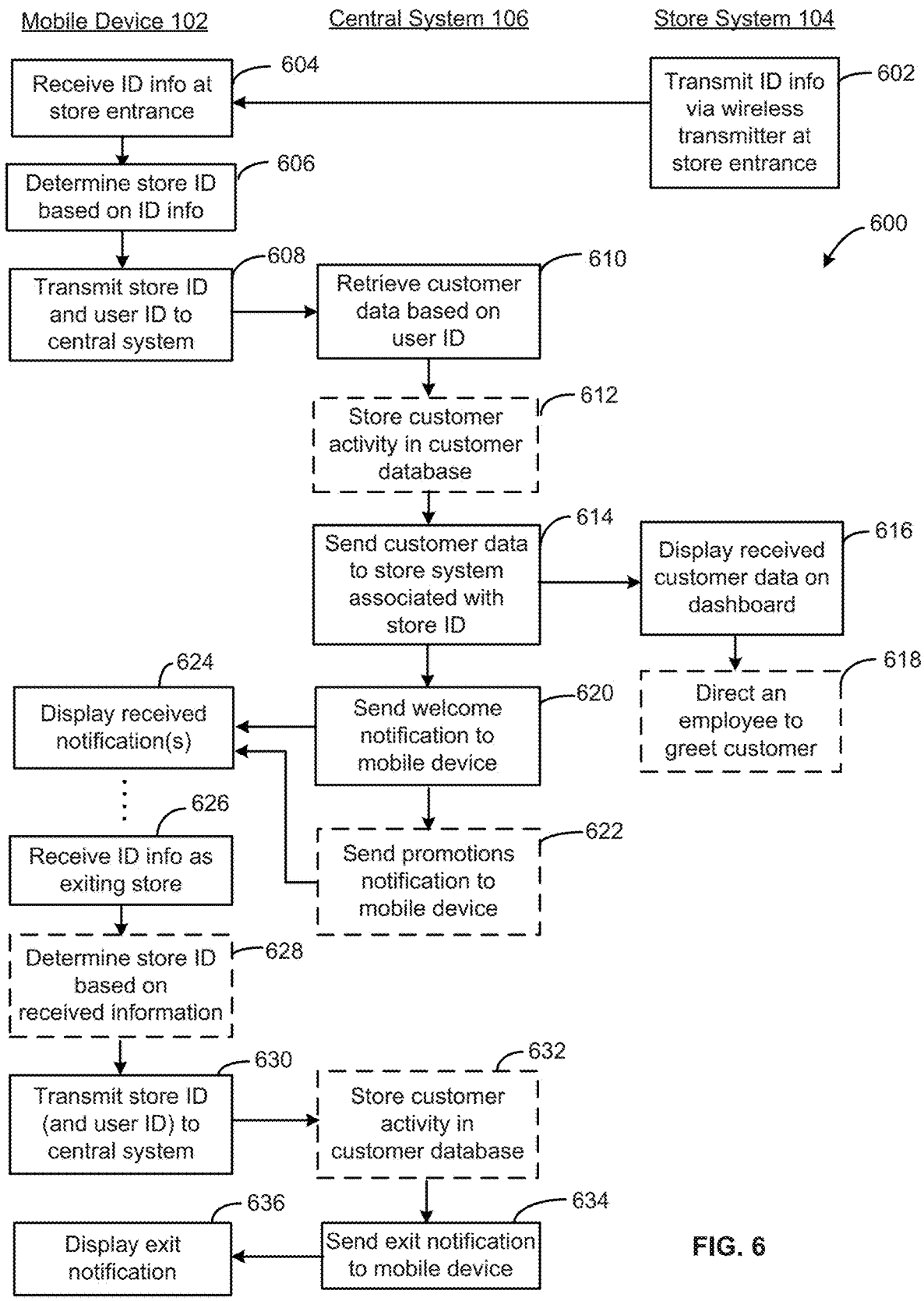
FIG. 6 is a flowchart illustrating exemplary functions and/or interactions performed by one or more components of the environment of FIG. 1 for identifying and communicating with a customer in a retail store, in accordance with embodiments.

FIG. 6 illustrates an exemplary sequence 600 of functions and/or interactions that may be performed by one or more components of the environment 100 to identify and communicate a customer in a retail store, such as the retail store 200 shown in FIG. 2, in accordance with embodiments. As shown in FIG. 6, the functions of the sequence 600 may be implemented using a respective one of the mobile device 102, the central system 106, and the store system 104 of the environment 100. In embodiments, the interactions between the mobile device 102, the central system 106, and/or the store system 104 may be implemented using the communication network 108 of the environment 100.

In some embodiments, relevant portions of the sequence 600 may be associated with one or more methods for identifying and communicating with a customer in a retail store using the mobile device 102, the central system 106, and/or the store system 104. In such cases, the method(s) may be carried out by one or more instances of the computing device 300 of FIG. 3 using software stored on a non-transitory computer readable medium (e.g., the memory 304) and executing on one or more computer processors (e.g., the processor 302) of the computing device(s) 300. For example, the software may include all or a portion of the store application 114, the central application 124, and/or the dashboard application 126, and the computing device(s) 300 may be implemented by the mobile device 102, the central server 118, and/or the employee device 126.

As illustrated, the sequence 600 may begin at block 602, where the store system 104 transmits identifying information (such as, e.g., identifying information 112 shown in FIG. 1) to the mobile device 102 using a wireless communication device (such as, e.g., communication device 110 shown in FIGS. 1 and 2) positioned at an entrance to the retail store (such as, e.g., entrance 204 of the store 200 shown in FIG. 2). According to embodiments, the wireless communication device may be configured to transmit the identifying information via the communication network 108 and using a wireless transmitter (such as, e.g., a Bluetooth-enabled transmitter) of the wireless communication device. The identifying information (also referred to herein as "ID info") can be stored in a memory of the wireless communication device and can include a store identifier (ID) configured to identify the retail store, a location identifier (ID) configured to identify the in-store location of the wireless communication device, and/or a device identifier (e.g., UUID) configured to identify the wireless communication device, itself.

At block 604, the mobile device 102 receives the identifying information from the wireless communication device via the communication network 108 and using a wireless receiver of the mobile device 102 (such as, e.g., short-range wireless receiver 316 shown in FIG. 3) as the user of the mobile device 102 enters the store (such as, e.g., customer 202a near the entrance 204, as shown in FIG. 2). The sequence 606 further includes block 606, where the mobile device 102 determines a store ID based on the identifying information. The technique used to obtain the store ID may differ depending on the content of the identifying information. For example, in embodiments where the identifying information does not include a store ID, the mobile device 102 may be configured to identify the store ID associated with the identifying information using a data table that correlates the identifying information associated with each of a plurality of wireless communication devices to the store identifier associated with the retail store in which the communication device is situated. However, in embodiments where the identifying information does include the store ID associated with the retail store, the mobile device 102 can retrieve the store ID directly from the received identifying information.

At block 608, the mobile device 102 transmits the store ID and a user ID associated with a user of the mobile device 102 to the central system 106 via the communication network 108 and using a wireless transmitter of the mobile device 102 (such as, e.g., wireless transceiver 314 shown in FIG. 3). In embodiments, the mobile device 102 can be configured to retrieve a user identifier (ID) stored in a memory of the mobile device 102 (such as, e.g., user ID 116). The user ID may be any type of information (e.g., username, account number, etc.) that is associated with a user of the mobile device 102 and is capable of uniquely identifying an account held by the user, the account being associated with the retail store (e.g., a store account, a loyalty account, a membership account, etc.).

At block 610, the central system 106 (and/or the central server 118 included therein) receives the store ID and user ID from the mobile device 102 and retrieves customer profile data associated with the user ID from a customer database (such as, e.g., customer database 120 shown in FIG. 1). The customer database can be configured to store customer profile data for each customer having a pre-established account with the store. The customer profile data can include the user ID, name and address information, age and gender information, a photo, account history, spending or purchase history, shopping preferences, a customer qualifier that categorizes the customer based on one or more pieces of the customer profile data (such as, e.g., spending history, shopping preferences, etc.), etc. In some embodiments, the sequence 600 further includes block 612, where the customer's current activity (e.g., detection of the mobile device 102 at the store entrance) is stored in the customer database as part of the customer profile data. In such cases, the customer profile data further includes a customer activity field for keeping a log or record of the customer's visits to each retail store, including when the customer visits the store, the identity of each store visited, the purchases made while at each store, etc.

At block 614, the central system 106 sends the customer profile data retrieved at block 610 to the store system that is associated with the store ID received from the mobile device 102, via the communication network 108. At block 616, the store system 104 displays the received customer data on an employee device (such as, e.g., employee device 126 shown in FIG. 1) as part of a customer dashboard (such as, e.g., customer dashboard 400 shown in FIG. 4). The customer dashboard can be a graphical user interface configured to display an entry for each customer within the store (such as, e.g., entries 401 shown in FIG. 4), each entry including customer profile data (such as, e.g., customer photo 402, customer name 404, and customer qualifier 408 shown in FIG. 4) and current location data (such as, e.g., customer location 406 shown in FIG. 4) for that customer.

The customer dashboard enables a user of the employee device to easily identify the customer(s) entering the retail store and determine which customer(s) may require extra attention or customer assistance, for example, based on the customer qualifier assigned to each customer and other profile data displayed in each customer's dashboard entry. In some embodiments, the sequence 600 includes block 618, where the store system 104 (and/or the employee device included therein) directs or dispatches an employee of the store to greet the customer that just entered the store. For example, upon receiving the customer data from the central system 106, the employee device may automatically send a notification to a communication device of the store employee (e.g., another employee device, a mobile device, an audio communication device, etc.), the notification directing the employee to greet the customer and in some cases, including information to help the employee identify the customer (e.g., photo, name, age, gender, etc.). In some embodiments, the employee notification may be triggered based on the customer qualifier assigned that customer. For example, the employee notification may be sent if the customer qualifier indicates that the customer is a "high value" customer.

In addition, the sequence 600 further includes block 620, where the central system 106 sends a welcome notification (such as, e.g., welcome notification 502 shown in FIG. 5) to the mobile device 102. The welcome notification may comprise text, image(s), or other content for conveying a message welcoming the user of the mobile device 102 to the retail store. The welcome message may be personalized based on the customer profile data obtained at step 610, for example, by including the customer's name in the welcome greeting. In some cases, the sequence 600 further includes block 622, wherein the central system 106 also sends a promotions notification (such as, e.g., promotions notification 504 shown in FIG. 5) to the mobile device 102. The promotions notification may include information about ongoing promotions, in-store specials, and other offers available at the retail store. In embodiments, the central system 106 may automatically generate and send the welcome notification and/or the promotions notification upon identifying the customer based on the user ID received from the mobile device 102. At block 624, the mobile device 102 displays the notification(s) received from the central system 106 on a display of the mobile device 102.

As shown in FIG. 6, the central system 106 can be configured to automatically generate and send the welcome notification and/or promotions notification upon detecting the customer at the store. In other embodiments, the central system 106 can be configured to generate and send the notifications upon receiving instructions from the store system 104. In still other embodiments, the store system 104 can be configured to generate and send notifications to the mobile device 102, instead of the central system 106.

In some embodiments, the sequence 600 ends after the notifications are displayed on the mobile device 102. In other embodiments, the sequence 600 continues to block 626, where, after some time, for example, while the user is exiting the store, the mobile device 102 receives identifying information from a wireless communication device positioned near the exit of the store. In some cases, the store exit is the same as the store entrance. In such cases, the mobile device 102 receives the identifying information from the same wireless communication device as in block 604. For example, the wireless communication device may be configured to continuously or periodically transmit the identifying information within a predefined transmission range, and the mobile device 102 can be configured to pick up or receive the identifying information when positioned within that transmission range (e.g., while entering and exiting the store). In other cases, a different wireless communication device may be positioned at the exit of the store and the identifying information transmitted by the device may uniquely identify that communication device.

In some cases, the sequence 600 further includes block 628, where the mobile device 102 determines a store ID based on the received identifying information (similar to block 606). At block 630, the mobile device 102 transmits the store ID to the central system 106 via the communication network 108, or otherwise informs the central system 106 that the customer is near the exit of the store. In some cases, the central system 106 may automatically determine that the customer is exiting the store upon receiving the store ID again from the mobile device 102, the first time being at block 610. In some cases, the mobile device 102 also transmits the user ID associated with the customer to the central system 106 at block 630 (e.g., similar to block 608). In other cases, the user ID may not be sent again because the central system 106 already identified the user of the mobile device in block 610. In some embodiments, the sequence 600 further includes block 632, where the customer's activity (e.g., detection of the customer exiting the store) is stored in the customer database (e.g., similar to block 612).

As shown in FIG. 6, the sequence 600 includes block 634, where the central system 106 generates and sends an exit notification (such as, e.g., exit notification 510) to the mobile device 102 via the communication network 108. The exit notification may include text, image(s), and/or other content for conveying a message that thanks the customer for visiting the store or otherwise acknowledges the customer's departure. At block 636, the mobile device 102 receives and displays the exit notification. In embodiments, the sequence 600 may end after block 636.

Figure 7:
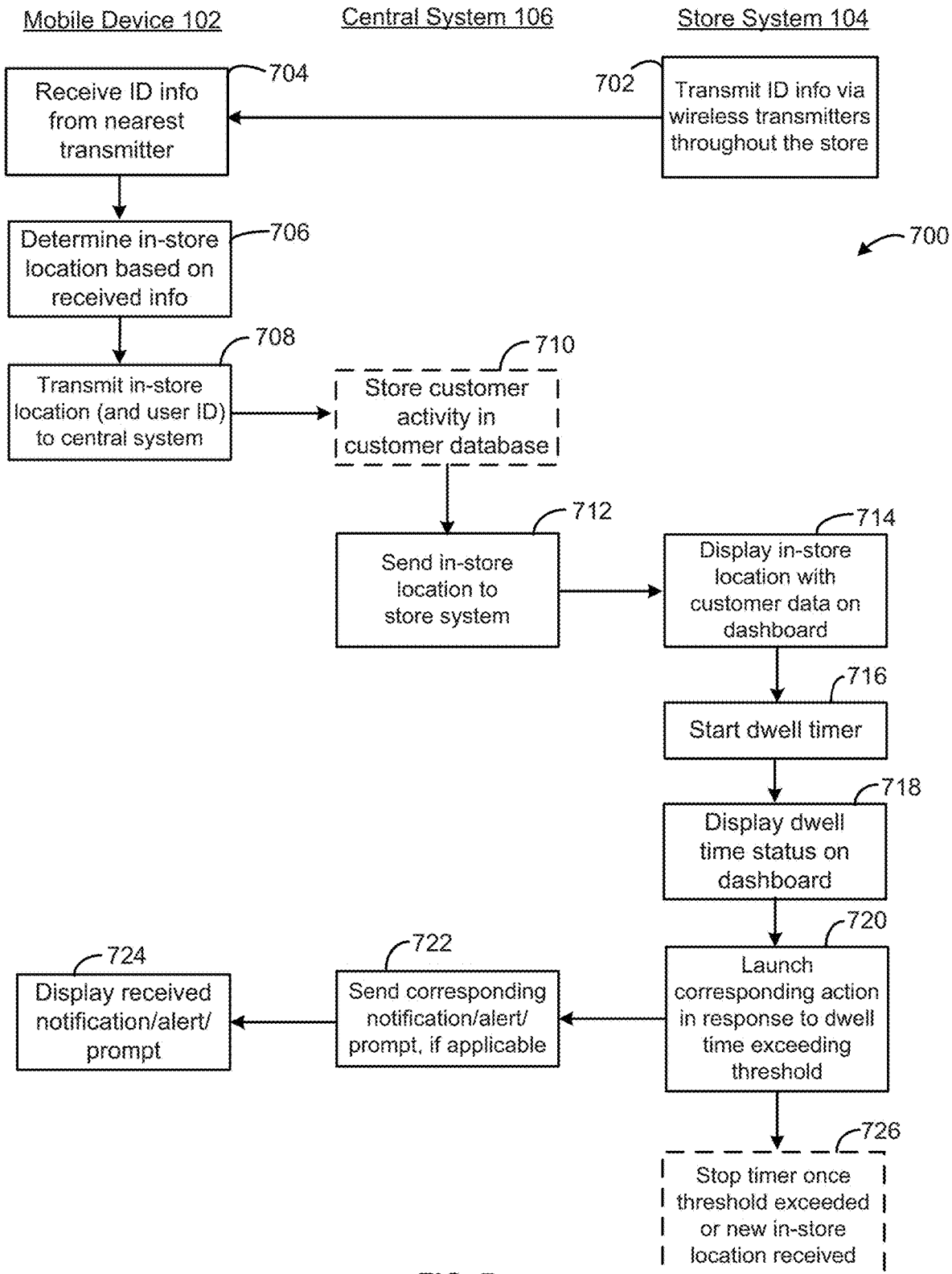
FIG. 7 is a flowchart illustrating exemplary functions and/or interactions performed by one or more components of the environment of FIG. 1 for anticipating customer needs in a retail store and providing appropriate customer assistance based thereon, in accordance with embodiments.

FIG. 7 illustrates an exemplary sequence 700 of functions and/or interactions that may be performed by one or more components of the environment 100 to anticipate one or more needs of a customer in a retail store, such as the retail store 200 shown in FIG. 2, and to provide appropriate customer assistance based thereon, in accordance with embodiments. As shown in FIG. 7, the functions of the sequence 700 may be implemented using a respective one of the mobile device 102, the central system 106, and the store system 104 of the environment 100. In embodiments, the interactions between the mobile device 102, the central system 106, and/or the store system 104 may be implemented using the communication network 108 of the environment 100. In some embodiments, the sequence 700 may be carried in conjunction with the sequence 600 shown in FIG. 6. For example, in one embodiment, the sequence 700 may begin after block 624 of the sequence 600 and may end before block 626 of the sequence 600. In other embodiments, the sequence 700 may be carried out independently of the sequence 600.

In some embodiments, relevant portions of the sequence 700 may be associated with one or more methods for identifying and communicating with a customer in a retail store using the mobile device 102, the central system 106, and/or the store system 104. In such cases, the method(s) may be carried out by one or more instances of the computing device 300 of FIG. 3 using software stored on a non-transitory computer readable medium (e.g., the memory 304) and executing on one or more computer processors (e.g., the processor 302) of the computing device(s) 300. For example, the software may include all or a portion of the store application 114, the central application 124, and/or the dashboard application 126, and the computing device(s) 300 may be implemented by the mobile device 102, the central server 118, and/or the employee device 126.

As illustrated, the sequence 700 may begin at block 702, where the store system 104 transmits identifying information (such as, e.g., identifying information 112 shown in FIG. 1) using a plurality of wireless communication devices (such as, e.g., communication devices 110 shown in FIG. 1) positioned at various locations throughout the retail store (for example, as shown in FIG. 2). According to embodiments, each wireless communication device may be configured to transmit the identifying information via the communication network 108 and using a wireless transmitter (such as, e.g., a Bluetooth-enabled transmitter) of the wireless communication device. The identifying information (also referred to herein as "ID info") transmitted by each device can be stored in a memory of the wireless communication device and can include a store identifier (ID) configured to identify the retail store, a location identifier (ID) configured to identify the in-store location of the wireless communication device, and/or a device identifier (e.g., UUID) configured to uniquely identify the wireless communication device, itself.

At block 704, the mobile device 102 receives identifying information from a nearby wireless communication device via the communication network 108 and using a wireless receiver of the mobile device 102 (such as, e.g., short-range wireless receiver 316 shown in FIG. 3). In embodiments, each wireless communication device may be configured to continuously or periodically transmit identifying information within a predefined transmission range, and the mobile device 102 can be configured to pick up or receive the identifying information from a respective communication device when positioned within the transmission range of that device.

At block 706, the mobile device 102 determines an in-store location of the respective wireless communication device based on the received identifying information. In embodiments, each wireless communication device can be assigned to a particular area of the retail store, such as, for example, a specific aisle, department, or other section of the store (e.g., as shown in FIG. 2), and the identifying information associated with a respective communication device can be tied to the assigned location of that device. The technique used to obtain the in-store location may differ depending on the content of the identifying information. For example, in embodiments where the identifying information does not include an in-store location ID, the mobile device 102 may be configured to identify the location ID associated with the identifying information using a data table that correlates the identifying information associated with each of the plurality of wireless communication devices to the in-store location at which the communication device is situated. However, in embodiments where the identifying information does include the location ID associated with the in-store location of the respective communication device, the mobile device 102 can retrieve the location ID directly from the received identifying information.

At block 708, the mobile device 102 transmits the in-store location to the central system 106 via the communication network 108 and using a wireless transmitter of the mobile device 102 (such as, e.g., wireless transceiver 314 shown in FIG. 3). In some cases, the mobile device 102 also transmits a user ID associated with a user of the mobile device 102 (such as, e.g., user ID 116 shown in FIG. 1), and/or a store ID associated with the retail store in which the mobile device 102 is located, to the central system 106.

In other cases, the user ID and/or store ID may have been previously provided to the central system 106, for example, when the user first entered the retail store (e.g., at step 608 shown in FIG. 6). In such cases, the mobile device 102 may not need to transmit the user ID and/or store ID again, and the customer profile data associated with the user ID may have already been retrieved from the customer database by the central system 106 (e.g., at block 610 shown in FIG. 6) and sent to the store system 104 (e.g., at block 614 shown in FIG. 6) for display on the employee device (e.g., at block 616 shown in FIG. 6). On the other hand, if the user ID is transmitted with the in-store location, the sequence 700 may additionally include steps (not shown) similar to blocks 610, 614, and 616 of the sequence 600.

In still other embodiments, the user ID may not be available, for example, if the customer is not a pre-established account holder at the retail store. In such cases, the central system 106 and/or the store system 104 may use information associated with the mobile device 102 to identify the customer for internal processing and/or to keep track of the customer's mobile device 102 while in the store. As will be appreciated, if no user ID or customer profile data is available for a given customer, the customer's entry in the customer dashboard may not include customer profile data, but may still include dwell time status, current location information, and any other information that is not dependent on customer profile data.

In some embodiments, the sequence 700 further includes block 710, where the central system 106 (and/or the central server 118 included therein) receives the in-store location from the mobile device 102 and stores the customer's current activity (e.g., detection of the mobile device 102 within the vicinity of the respective wireless communication device) in the customer database as part of the customer profile data (e.g., similar to block 612 in FIG. 6). For example, the customer profile data may include a customer activity field for keeping a log or record of the customer's visits to the retail store, including the customer's movements within the store, an identity of the in-store locations visited, the purchases made while at the store, the purchases that were not made (e.g., after dwelling in a department for the threshold amount of time), the department, aisle, or section of the store in which the customer dwelled and for how long, etc.

At block 712, the central system 106 sends the in-store location of the mobile device 102 to the store system 104 via the communication network 108. At block 714, the store system 104 displays the received in-store location on an employee device (such as, e.g., employee device 126 shown in FIG. 1) as part of a customer dashboard (such as, e.g., customer dashboard 400 shown in FIG. 4) in association with customer profile data for the user. The customer dashboard can be a graphical user interface configured to display an entry for each customer within the store (such as, e.g., entries 401 shown in FIG. 4), each entry including the customer profile data (such as, e.g., customer photo 402, customer name 404, and customer qualifier 408 shown in FIG. 4) and the current in-store location data (such as, e.g., customer location 406 shown in FIG. 4) for that customer.

At block 716, the store system 104 (and/or the employee device 126 included therein) starts a timer (also referred to herein as "dwell timer") for keeping track of an amount of time spent by the customer at the current in-store location. At block 718, the store system 104 displays a dwell time status on the customer dashboard (such as, e.g., dwell time status 410 shown in FIG. 4). In some cases, the dwell time status reflects an actual amount of time spent by the customer in the current location and is updated in real time (or near real-time). In other cases, the dwell time status reflects a relative amount of time as compared to a predetermined threshold (e.g., as shown in FIG. 4). For example, in some embodiments, the predetermined threshold is two minutes, and the dwell time status indicates whether the customer's dwell time is less than, equal to, or greater than the threshold.

At block 720, the store system 104 launches a corresponding customer service action in response to the dwell time exceeding or meeting the predetermined threshold. In embodiments, the corresponding customer service action can vary depending on one or more aspects of the customer profile data (such as, e.g., customer qualifier, purchase history, etc.) and/or current customer location, as described herein. In some cases, the employee device may carry out the customer service action, for example, when the action is directing a store employee to the customer's current location within the store to assist the customer. For example, if the customer is standing or dwelling near a checkout counter (such as, e.g., customer 202b near checkout counter 210, as shown in FIG. 2) for more than the predetermined threshold time, the employee device may direct a store employee or manager to the checkout counter to open an additional register or other POS device. In some embodiments, the employee device is configured to automatically send a notification to a communication device of the store employee (e.g., another employee device, a mobile device, an audio communication device, etc.) for directing the employee to assist the customer. In such cases, the notification can include information to help the employee identify the customer (such as, e.g., photo, name, age, gender, etc.).

In other cases, once the threshold is met or exceeded, the employee device and/or store system 104 may direct the central system 106 to carry out the customer service action, for example, when the action is sending a message to the mobile device 102. In such cases, the sequence 700 further includes block 722, where the central system 106 sends notifications, prompts, alerts, or other messages to the mobile device 102 (such as, e.g., promotions alert 504, Rx chat prompt 506, and/or product selector prompt 508 shown in FIG. 5) via the communication network 108. At block 724, the mobile device 102 displays the message(s) received from the central system 106 on a display of the mobile device 102.

In embodiments, the type of message sent to the mobile device 102 can vary depending on the current location of the customer within the store. For example, if the customer is standing or dwelling in a health and wellness department (such as, e.g., customer 202c between health & wellness aisles 5 and 6, as shown in FIG. 2) and/or a beauty department for more than the threshold time, the central system 106 may send the product selector prompt to the mobile device 102, the prompt configured to open a product selector tool for helping the customer locate or select an appropriate product. As another example, if the customer is standing or dwelling near a pharmacy counter (such as, e.g., customer 202d near pharmacy counter 208, as shown in FIG. 2) of the store for more than the threshold time, the central system 106 may send the Rx chat prompt to the mobile device 102, the prompt configured to open a chat interface for enabling the customer to message or communicate with an online customer service representative, a pharmacist, or other store employee to discuss a pharmacy product or the customer's pharmacy order.

In some embodiments, the sequence 700 further includes block 726, where the employee device stops the dwell timer once the threshold is exceeded by a predetermined amount and/or once a new in-store location is received from the central system 106. A new in-store location may be received using the same techniques described above with respect to blocks 702, 704, 706, and 708. For example, if the customer moves from the current location to a new location within the store (for example, from beauty aisle 2 to the photo counter 206, as shown in FIG. 2), the mobile device 102 may receive a new set of identifying information from the wireless communication device that is positioned near the new location (e.g., similar to the block 704). The new identifying information may then be processed to determine the in-store location of the customer (e.g., similar to block 706), and the new in-store location may be sent to the central system 106 (e.g., similar to block 708) for conveyance to the store system 104 (e.g., similar to block 712) and display on the employee device (e.g., similar to block 714). Once a new in-store location is received, the dwell timer may be restarted (e.g., similar to block 716), and blocks 718 through 724 may be repeated.

The sequence 700 may end once the central system 106 determines that the customer has exited the store, for example, as described above with respect to sequence 600, or when no new in-store location information is detected by the mobile device 102 and/or received by the central system 106.

In FIGS. 6 and 7, certain blocks of the sequences 600 and 700 (e.g., blocks 602, 604, and 606 in FIG. 6 and blocks, 702, 704, and 706 in FIG. 7) represent exemplary embodiments for detecting a presence of the mobile device 102 at, near, or within the retail store. In other embodiments, the sequences 600 and/or 700 may use other techniques for detecting a proximity of the mobile device 102 to the retail store and/or to a specific location within the retail store. For example, while embodiments described herein utilize iBeacon devices to determine the location of the mobile device 102 within the store, other embodiments of the store system 104 may include any other suitable proximity-detection or proximity-determining devices for tracking or identifying a location of the mobile device 102 within the store. In another embodiment, the store system 104 may include a video camera system configured to capture images of the customer as he moves through the store and use the images to identify and/or track the customer throughout the store.

In yet another embodiment, the store system 104 may be configured to detect and track the mobile device 102 throughout the store using a device identifier (ID) that is uniquely associated with the mobile device 102 (such as, e.g., the MacID for an Apple iPhone) and is broadcast by the mobile device 102 to the store system 104. In such cases, the store system 104 may include one or more wireless receivers (not shown) for detecting or receiving the wireless signal transmitted by the mobile device 102. In some cases, the store system 104 and/or the central system 106 may be configured to collect customer activity information for the mobile deice 102 before the customer has an account with the store. In such cases, the store system 104 and/or the central system 106 may store the customer activity information in association with readily-available identifying information for the customer and/or the mobile device 102, such as, e.g., the MacID. Once the customer sets up a store account, the previously-stored information may be retroactively linked to the customer's new account and added to the customer's profile data.

In certain embodiments, the process descriptions or blocks in the figures, such as FIGS. 6 and 7, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A computer-implemented method of identifying and communicating with a user through a mobile device of the user, the method comprising:
    receiving, from the mobile device, a user identifier associated with the user and an entity identifier associated with an entity location, the entity identifier obtained by the mobile device from a wireless transmitter located adjacent to an entrance of the entity location;
    retrieving user profile data associated with the user identifier from a user database, the user profile data including a user qualifier that categorizes the user into a particular segment of a pre-defined group of segments into which users are categorized based on account histories of the users;
    receiving, from the mobile device, a location identifier indicative of an in-store location of the user within a region of the entity location, the location identifier obtained by the mobile device from another wireless transmitter located within the entity location and associated with the region of the entity location;
    determining, by one or more processors, based on the location identifier, the in-store location of the user and a dwell time indicating an amount of time the user has been dwelling at the in-store location;
    based on the user qualifier, the in-store location of the user, and the dwell time of the user:
        determining, by the one or more processors, a set of selectable actions that are personalized for the user, and causing, by the one or more processors, the set of selectable actions, the user qualifier, the in-store location, and the dwell time to be presented on a display device of the entity location, the dwell time updated in real time or near real time;
    sending at least one notification to the mobile device of the user for display thereon, the at least one notification comprising at least one of information related to the entity location and a portion of the user profile data; and
    initiating, by the one or more processors, a particular action of the set of selectable actions based on a selection of the particular action received at the display device of the entity location.

2. The computer-implemented method of claim 1, further comprising notifying at least one assistance provider to greet the user upon the user entering the entity location.

3. The computer-implemented method of claim 1,
    further comprising retrieving entity data associated with the entity identifier from an entity database, the entity data including promotions information related to the entity location; and
    wherein the at least one notification is configured to include the promotions information.

4. The computer-implemented method of claim 1, further comprising:
    detecting a presence of the user near an exit of the entity location; and sending an additional notification to the mobile device for display thereon.

5. The computer-implemented method of claim 1, wherein:
    the user is a first user, the user qualifier is a first user qualifier, the in-store location is a first in-store location, the dwell time is a first dwell time, and the set of selectable actions is a first set of selectable actions; and
    the method further comprises:
        based on a second user qualifier of a second user, a second in-store location of the second user, and a second dwell time of the second user, determining a second set of selectable actions personalized for the second user, the second set of selectable actions different than the first set of selectable actions; and
        causing the second set of selectable actions to be presented on the display device of the entity location.

6. The computer-implemented method of claim 1, further comprising causing the set of selectable actions presented on the display device of the entity location to be updated based on received updates to at least one of the in-store location of the user or the dwell time of the user at the in-store location.

7. The computer-implemented method of claim 1, further comprising causing the presentation of the dwell time of the user to be updated at the display device of the entity location in real time or in near real time, and causing an alert to be displayed when the dwell time of the user exceeds a threshold.

8. The computer-implemented method of claim 1, wherein initiating the particular action of the set of selectable actions includes transmitting information for display at the mobile device of the user.

9. The computer-implemented method of claim 1, wherein initiating the particular action of the set of selectable actions includes transmitting an instruction to a computing device of an agent of the entity location to take a particular customer service action with respect to the user.

10. A system in network communication with a mobile device of a customer, the system comprising:
    a retail store system including:
        an employee device configured to display customer profile data associated with the customer, an in-store location of the customer within a region of a retail store, a dwell time of the customer at the in-store location, and a set of selectable actions that are personalized for the customer, the displayed customer profile data including a customer qualifier that categorizes the customer into a particular customer segment of a pre-defined group of customer segments into which customers are categorized based on account histories of the customers, and the set of selectable actions determined based on the customer qualifier of the customer, the in-store location of the customer, and the dwell time of the customer;

a wireless transmitter positioned adjacent to an entrance of the retail store, the wireless transmitter being configured to transmit a store identifier associated with the retail store within a predetermined transmission range, wherein the mobile device receives the store identifier upon entering the predetermined transmission range; and another wireless transmitter positioned within the retail store and associated with the region of the retail store, the another wireless transmitter being configured to transmit a location identifier associated with the region of the retail store within another predetermined range, wherein the mobile device receives the location identifier upon entering the another predetermined transmission range; and a central system in network communication with the mobile device and the retail store system, the central system including:

a customer database configured to store the customer profile data in association with a user identifier associated with the customer, and a central server configured to:
receive, from the mobile device, the store identifier, the user identifier, the location identifier, and in real time or near real time a dwell time indicating an amount of time the customer has been dwelling at the in-store location within the region of the retail store;

retrieve the customer profile data from the customer database based on the user identifier;

determine the in-store location of the customer based on the location identifier;

determine the set of selectable actions based on the customer qualifier, the in-store location of the customer, and the dwell time of the customer at the in-store location;

provide the customer profile data, the in-store location of the customer, the dwell time of the customer, and the set of selectable actions to the employee device;

send at least one notification to the mobile device for display thereon, the at least one notification comprising at least one of information related to the retail store and a portion of the customer profile data; and initiate a particular action of the set of selectable actions based on a selection of the particular action entered at the employee device.

11. The system of claim 10, wherein:
the central system further includes a store database configured to store retail store data in association with the store identifier of the retail store; the central server is further configured to retrieve the retail store data from the store database based on the store identifier received from the mobile device;
the retail store data includes promotions information related to the retail store; and
the at least one notification is configured to include the promotions information.

12. The system of claim 10, wherein the wireless transmitter is a short range wireless transmitter.

13. The system of claim 10, wherein the set of selectable actions includes an action for notifying at least one employee to greet the customer upon the customer entering the retail store.

14. The system of claim 10, wherein the central server is further configured to detect a presence of the customer near an exit of the retail store, and send an additional notification to the mobile device for display thereon, the additional notification being related to the customer exiting the retail store.

15. The system of claim 10, wherein:
the customer is a first customer, the customer qualifier is a first customer qualifier, the in-store location is a first in-store location, the dwell time is first dwell time, and the set of selectable actions is a first set of selectable actions;
the employee device is configured to further display a second customer qualifier that categorizes a second customer into a respective segment of the pre-defined group of customer segments, a second in-store location of the second customer within the retail store, a second dwell time of the second customer at the second in-store location, and a second set of selectable actions that are personalized for the second customer and that are different than the first set of selectable actions personalized for the first customer; and
the central server is further configured to determine the second set of selectable actions based on the second customer qualifier, the second in-store location of the second customer, and the second dwell time of the second customer.

16. The system of claim 10, wherein the central server is further configured to:
determine an updated set of selectable actions based on an update to at least one of the in-store location of the customer or the dwell time of the customer at the in-store location; and
provide the updated set of selectable options to the employee device for display thereon.

17. The system of claim 10, the particular action of the set of selectable actions includes a transmission of information for display at the mobile device of the customer or a transmission of an instruction to a computing device of an agent of the entity location to take a particular customer service action with respect to the customer.

18. A computer-implemented method of communicating a presence of a customer associated with a mobile device in a retail store, the method comprising:
receiving, via a wireless receiver of the mobile device, a store identifier associated with the retail store, the store identifier being transmitted by a wireless transmitter located adjacent to an entrance of the retail store, and the mobile device receiving the store identifier upon entering a predetermined transmission range of the wireless transmitter;
receiving, via the wireless receiver of the mobile device, a location identifier associated with an in-store location of the customer within a region of the store, the location identifier being transmitted by another wireless transmitter located within the store and associated with the region of the store, and the mobile device receiving the location identifier upon entering another predetermined transmission range of the another wireless transmitter;
retrieving, from a memory of the mobile device, a user identifier associated with the customer;

determining in real time or near real time, at a processor of the mobile device, a dwell time indicating an amount of time the customer has been dwelling at the in-store location within the region of the store;

transmitting, via a wireless transceiver of the mobile device, the user identifier, the store identifier, the location identifier, and the dwell time to a central server, the central server configured to display, at a display device of the retail store, customer profile data associated with the user identifier, the in-store location of the customer, the dwell time of the customer at the in-store location, and a set of selectable actions that are personalized for the customer, the displayed customer profile data including a customer qualifier that categorizes the customer into a particular customer segment of a predefined group of customer segments into which customers are categorized based on account histories of the customers, and the set of selectable actions determined based on the customer qualifier, the in-store location of the customer, and the dwell time of the customer at the in-store location;

receiving, via the wireless transceiver, at least one notification from the central server, the at least one notification transmitted to the mobile device based on a selection of a particular action of the set of selectable actions displayed at the display device of the retail store, and the at least one notification comprising at least one of information related to the retail store and the customer profile data; and displaying the at least one notification on a display of the mobile device.

19. The computer-implemented method of claim 18, wherein the at least one notification includes promotions information related to the retail store.

20. The computer-implemented method of claim 18, further comprising:

receiving the store identifier for a second time from the wireless transmitter when the customer nears an exit of the retail store;

transmitting the store identifier to the central server;

receiving, from the central server, an additional notification related to the customer exiting the retail store; and displaying the additional notification on the display.

* * * * *